US011796225B2

(12) United States Patent
Suver

(10) Patent No.: US 11,796,225 B2
(45) Date of Patent: Oct. 24, 2023

(54) GEOEXCHANGE SYSTEMS INCLUDING GROUND SOURCE HEAT EXCHANGERS AND RELATED METHODS

(71) Applicant: Paul W. Suver, Seattle, WA (US)

(72) Inventor: Paul W. Suver, Seattle, WA (US)

(73) Assignee: American Piledriving Equipment, Inc., Kent, WA (US)

( * ) Notice: Subject to any disclaimer, the term of this patent is extended or adjusted under 35 U.S.C. 154(b) by 0 days.

(21) Appl. No.: 14/054,521

(22) Filed: Oct. 15, 2013

(65) Prior Publication Data

US 2014/0110082 A1 Apr. 24, 2014

Related U.S. Application Data

(60) Provisional application No. 61/715,756, filed on Oct. 18, 2012.

(51) Int. Cl.
*F24T 10/17* (2018.01)
*F24T 10/00* (2018.01)

(52) U.S. Cl.
CPC ........... *F24T 10/17* (2018.05); *F24T 2010/53* (2018.05); *Y02E 10/10* (2013.01); *Y10T 29/49826* (2015.01)

(58) Field of Classification Search
CPC ..... Y02E 10/125; Y02E 10/18; F28D 7/1669; F28D 7/163; F28D 2001/0266
(Continued)

(56) References Cited

U.S. PATENT DOCUMENTS 2,438,720 A * 3/1948 Smith ..................... E21B 36/00
159/902
3,012,609 A * 12/1961 Toelke .......................... 175/4.58
(Continued)

FOREIGN PATENT DOCUMENTS

DE 3142347 A1 5/1983
DE 4437124 A1 4/1996
(Continued)

OTHER PUBLICATIONS

Rees, S.J., J.D. Spitler, Z. Deng, C.D. Orio and C.N. Johnson. 2004. A Study of Geothermal Heat Pump and Standing Column Well Performance. ASHRAE Transactions, 110(1):3-13.*
(Continued)

*Primary Examiner* — Harry E Arant
(74) *Attorney, Agent, or Firm* — Seed IP Law Group LLP

(57) ABSTRACT

A geoexchange system is provided which includes a ground source heat exchanger positioned in the ground and a distribution system coupled to the ground source heat exchanger to circulate water through the ground source heat exchanger during operation. The distribution system may include a supply line, a return line and a circulation pump to circulate water through the internal fluid cavity of the ground source heat exchanger via the supply and return lines. The distribution system may further include a purge valve to release gas from the distribution system and a fill circuit that is configured to automatically replenish the internal fluid cavity of the ground source heat exchanger with water upon leakage of water from the ground source heat exchanger or conversion of water from the ground source heat exchanger to gas. Other geoexchange systems and related methods are also provided.

30 Claims, 3 Drawing Sheets

(58) Field of Classification Search
USPC .............................................. 165/45; 62/260
See application file for complete search history.

(56) References Cited

U.S. PATENT DOCUMENTS

| | | | |
|---|---|---|---|
| 3,935,900 | A | 2/1976 | Waters |
| 4,019,577 | A * | 4/1977 | Fitch .................... E21B 43/247 166/259 |
| 4,448,237 | A | 5/1984 | Riley |
| 4,574,875 | A | 3/1986 | Rawlings et al. |
| 4,577,679 | A * | 3/1986 | Hibshman ........... F28D 20/0052 165/45 |
| 4,741,389 | A | 5/1988 | Smith |
| 4,779,673 | A * | 10/1988 | Chiles et al. ................... 165/45 |
| 4,911,229 | A * | 3/1990 | McElroy ........................ 165/45 |
| 4,993,483 | A | 2/1991 | Harris |
| 5,339,890 | A * | 8/1994 | Rawlings ....................... 165/45 |
| 5,618,134 | A | 4/1997 | Balch |
| 6,138,744 | A | 10/2000 | Coffee |
| 6,386,295 | B1 | 5/2002 | Suver |
| 6,736,191 | B1 | 5/2004 | Lindberg et al. |
| 6,942,430 | B1 | 9/2005 | Suver |
| 7,377,122 | B2 | 5/2008 | Kidwell et al. |
| 7,392,855 | B1 | 7/2008 | White |
| 7,461,691 | B2 | 12/2008 | Vinegar et al. |
| 7,490,657 | B2 * | 2/2009 | Ueyama ................. F25B 30/06 165/45 |
| 7,563,496 | B2 | 7/2009 | Watson |
| 7,566,980 | B2 | 7/2009 | Fein et al. |
| 7,950,876 | B2 | 5/2011 | Suver |
| 2005/0061472 | A1 | 3/2005 | Guynn et al. |
| 2006/0201179 | A1 | 9/2006 | Kidwell et al. |
| 2007/0029067 | A1 | 2/2007 | Kidwell et al. |
| 2007/0051492 | A1 * | 3/2007 | Ross ............................... 165/45 |
| 2008/0016671 | A1 | 1/2008 | Watson |
| 2008/0148733 | A1 | 6/2008 | Fein et al. |
| 2008/0169084 | A1 | 7/2008 | Bullivant |
| 2008/0314593 | A1 | 12/2008 | Vinegar et al. |
| 2009/0110489 | A1 | 4/2009 | Armstrong |
| 2009/0250200 | A1 | 10/2009 | Kidwell et al. |
| 2010/0200192 | A1 * | 8/2010 | Consigny ........................ 165/45 |
| 2012/0012276 | A1 * | 1/2012 | Von Herzen et al. .......... 165/45 |
| 2013/0068418 | A1 * | 3/2013 | Gotland .................... F24J 3/08 165/45 |

FOREIGN PATENT DOCUMENTS

| | | |
|---|---|---|
| DE | 102009014121 A1 | 10/2010 |
| EP | 0189733 A1 | 8/1986 |
| EP | 0582118 A1 | 2/1994 |
| EP | 1486741 A1 | 12/2004 |
| EP | 1923569 A1 | 5/2008 |
| FR | 2918086 A1 | 1/2009 |
| GB | 2478130 A | 8/2011 |
| WO | 2012/125974 A1 | 9/2012 |

OTHER PUBLICATIONS

Boranyak, Sharon, "International Cooperation Expands Energy Foundation Technology," Deep Foundations, Mar./Apr. 2013, pp. 51-54.

Paper entitled "Heating and Cooling Structures with Steel Pile Foundations" made available to attendees at DFI's 37th Annual Conference on Deep Foundations in Houston, TX sometime during Oct. 16, 2012-Oct. 19, 2012, 8 pages.

* cited by examiner

GEOEXCHANGE SYSTEMS INCLUDING GROUND SOURCE HEAT EXCHANGERS AND RELATED METHODS

BACKGROUND

Technical Field

The present disclosure is directed to geoexchange systems including ground source heat exchangers and related methods that utilize the earth as a heat sink and/or heat source.

Description of the Related Art

Various geoexchange systems (sometimes referred to as geothermal systems) are known, including closed-loop systems and open standing well systems. A geoexchange system may be summarized as a heating and cooling system for interior spaces wherein the earth is utilized as a heat source when heating the interior space and/or a heat sink when cooling the interior space. Components of known geoexchange systems typically include, among other things, a heat pump, a ground source heat exchanger and a distribution system. Many geoexchange systems utilize air ducting for the distribution system and polyethylene piping in the earth for the ground source heat exchanger. Such systems, however, suffer from a variety of drawbacks and deficiencies. For example, many ground source loops of known systems are expensive, messy to install, require toxic chemicals and are prone to failure. Moreover, the systems are difficult to service and also difficult to expand or augment if additional heating or cooling capacity is needed or desired. These and other factors are believed to contribute to the current under-utilization of geoexchange systems and geothermal resources.

BRIEF SUMMARY

Embodiments described herein provide geoexchange systems including ground source heat exchangers and related methods that utilize the earth as a heat sink and/or heat source to provide heating and/or cooling functionality for homes, buildings or other structures. The ground source heat exchangers are particularly robust and easily installable and reconfigurable to provide versatile heating and/or cooling systems. In some instances, ground source heat exchangers are provided in the form of deep foundation members such as piles that are drivable or otherwise positionable in the ground, and which may serve as structural support members in addition to providing heating and cooling functionalities. In addition, in some embodiments, a fill circuit is provided to automatically fill or charge a ground source loop of the system with supplemental heat transfer medium upon leakage or other loss of such fluid from the ground source loop.

According to one embodiment, a geoexchange system may be summarized as including a ground source heat exchanger in the form of a metallic vessel that defines an internal fluid cavity and a distribution system coupled to the ground source heat exchanger to circulate a heat transfer medium (preferably water) through the internal fluid cavity of the ground source heat exchanger during operation. The distribution system may include a supply line to deliver the heat transfer medium to the ground source heat exchanger and a return line to withdraw the heat transfer medium from the ground source heat exchanger. The distribution system may further include a fill circuit to automatically replenish the ground source heat exchanger with supplemental heat transfer medium upon leakage of the heat transfer medium from the metallic vessel thereof, which in some instances may be prone or susceptible to leakage in an undamaged condition.

In some instances, the geoexchange system may be operable with a heat pump to provide heating and/or cooling functionality, such as, for example providing heating and/or cooling functionality for a building or other structure. The geoexchange system may be configured to absorb heat from the ground during a heating mode and/or to reject heat into the ground during a cooling mode.

The supply line, the return line and the ground source heat exchanger may collectively define a ground source loop, and the fill circuit may include a check valve to introduce supplemental water into the ground source loop from a supplemental water source in response to an existence of a pressure differential across the check valve that exceeds a selected threshold. The operating pressure of the ground source loop may decline below the threshold upon water leakage from the ground source heat exchanger or conversion of water in the ground source loop to gas. The upstream side of the check valve may be in direct unobstructed fluid communication with supplemental water from the supplemental water source. The distribution system may further include a purge valve to release gas from the distribution system. The purge valve may be located at or proximate the highest point or elevation in the ground source loop.

The metallic vessel of the heat exchanger may be a deep foundation member. For example, the metallic vessel may be a deep foundation member in the form of a pile or other load bearing member. The deep foundation member may include an auger structure at a lower end thereof to enhance drivability. The deep foundation member may also include an engagement structure at an upper end thereof for coupling to a rotary pile driver system or other deep foundation installation system.

The metallic vessel of the ground source heat exchanger may include a steel tubular casing and end caps to define a substantially closed fluid vessel. The metallic vessel of the ground source heat exchanger may be a deep foundation member or a load-bearing member, such as, for example, an anchor for an aboveground structure, a foundation support for a structure, or a soil retention element. The metallic vessel of the ground source heat exchanger may comprise a tubular structure having an exterior surface that interfaces with the ground and an interior surface that is in contact with the water circulated through the ground source heat exchanger during operation.

In some instances, the supply line of the fluid distribution system includes an outlet to discharge the heat transfer medium into the internal fluid cavity of the metallic vessel of the ground source heat exchanger and the return line includes an inlet to withdraw the heat transfer medium from the internal fluid cavity of the metallic vessel of the ground source heat exchanger. In some instances, the outlet of the supply line and the inlet of the return line may each be located at a different height along a longitudinal length of the ground source heat exchanger. In addition, the outlet of the supply line and the inlet of the return line may each be located within an upper portion of the internal fluid cavity of the metallic vessel of the ground source heat exchanger. In other instances, the outlet of the supply line and the inlet of the return line may each be located at opposing ends of the ground source heat exchanger. The outlet of the supply line and the inlet of the return line may be offset from a lower end of the metallic vessel of the ground source heat exchanger such that a lower half of the internal fluid cavity of the metallic vessel is occupied only by a standing column of the heat transfer medium.

According to another embodiment, a geoexchange system may be summarized as including a ground source heat exchanger positioned in the ground, the ground source heat exchanger comprising a metallic vessel that defines an internal fluid cavity, and a distribution system coupled to the ground source heat exchanger to circulate water through the ground source heat exchanger during operation. The distribution system may include a supply line, a return line, and a circulation pump to circulate water through the internal fluid cavity of the ground source heat exchanger via the supply and return lines. The distribution system may further include a purge valve to release gas from the distribution system and a fill circuit that is configured to automatically replenish the internal fluid cavity of the ground source heat exchanger with water upon leakage of water from the ground source heat exchanger or conversion of water from the ground source heat exchanger to gas. The geoexchange system may be operable with a heat pump to provide heating and/or cooling functionality and may be configured to absorb heat from the ground during a heating mode and/or to reject heat into the ground during a cooling mode.

According to another embodiment, a method of installing a geoexchange system may be summarized as including installing at least one ground source heat exchanger into the ground, the ground source heat exchanger comprising a metallic vessel having an exterior surface that interfaces with the ground and an interior surface that defines an internal fluid cavity; coupling the at least one ground source heat exchanger to a heat pump via a fluid distribution system, the fluid distribution system including a supply line, a return line and a circulation pump to circulate water through the internal fluid cavity of the ground source heat exchanger during operation to absorb heat from the ground during a heating mode and/or to reject heat into the ground during a cooling mode; and coupling the fluid distribution system to a water source to enable automatic replenishment of the heat exchanger with supplemental water upon water loss.

The method may further include coupling a plurality of ground source heat exchangers to the heat pump in a series arrangement, a parallel arrangement or a combination thereof. The method may further include acquiring performance data from the plurality of ground source heat exchangers and installing one or more supplemental ground source heat exchangers into the ground and coupling the one or more supplemental ground source heat exchangers to the heat pump based at least in part on said performance data and an expected demand of the heat pump. The method may further include installing at least one supplemental ground source heat exchanger into the ground and coupling the at least one supplemental ground source heat exchanger to the heat pump in response to a change in expected demand of the heat pump. Installing at least one ground source heat exchanger into the ground may include driving the at least one ground source heat exchanger into the ground with an installation system, or positioning the at least one ground source heat exchanger into a cavity pre-drilled in the ground.

According to another embodiment, a method of operating a geoexchange system may be summarized as including circulating water through a ground source loop to absorb heat from the ground during a heating mode and/or to reject heat into the ground during a cooling mode, the ground source loop including at least one ground source heat exchanger comprising a metallic fluid vessel having an exterior surface that interfaces with the ground and an interior surface that is in contact with said water during operation; and introducing supplemental water into the ground source loop upon water leakage from the at least one ground source heat exchanger or conversion of water from the ground source loop to gas.

The method of operating a geoexchange system may further include destressing the at least one ground source heat exchanger and the ground surrounding the at least one ground source heat exchanger. The ground source loop may be coupled to a heat pump to exchange heat with a heat exchanger thereof, and destressing the at least one ground source heat exchanger and the ground surrounding the at least one ground source heat exchanger may include circulating water through the at least one ground source heat exchanger with a circulation pump. During destressing, the heat pump may be active or inactive. Circulating water through the at least one ground source heat exchanger with a circulation pump may include circulating water through the at least one ground source heat exchanger at a volumetric flow rate that is less than an average volumetric flow rate at which the water is circulated when the heat pump is active. Destressing the at least one ground source heat exchanger and the ground surrounding the at least one ground source heat exchanger may include discharging water from the ground source loop and introducing supplemental water into the ground source loop having a different average temperature than the discharged water. Introducing supplemental water into the ground source loop upon water leakage from the at least one ground source heat exchanger or conversion of water from the ground source loop to gas may include automatically maintaining the ground source loop at operational capacity despite such water loss from the at least one ground source heat exchanger.

DETAILED DESCRIPTION

In the following description, certain specific details are set forth in order to provide a thorough understanding of various disclosed embodiments. However, one of ordinary skill in the relevant art will recognize that embodiments may be practiced without one or more of these specific details, or with other methods, components, materials, etc. In other instances, well-known structures and devices associated with geoexchange systems and deep foundation members and related installation methods and methods of use have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics described herein may be combined in any suitable manner in one or more embodiments.

Figure 1:
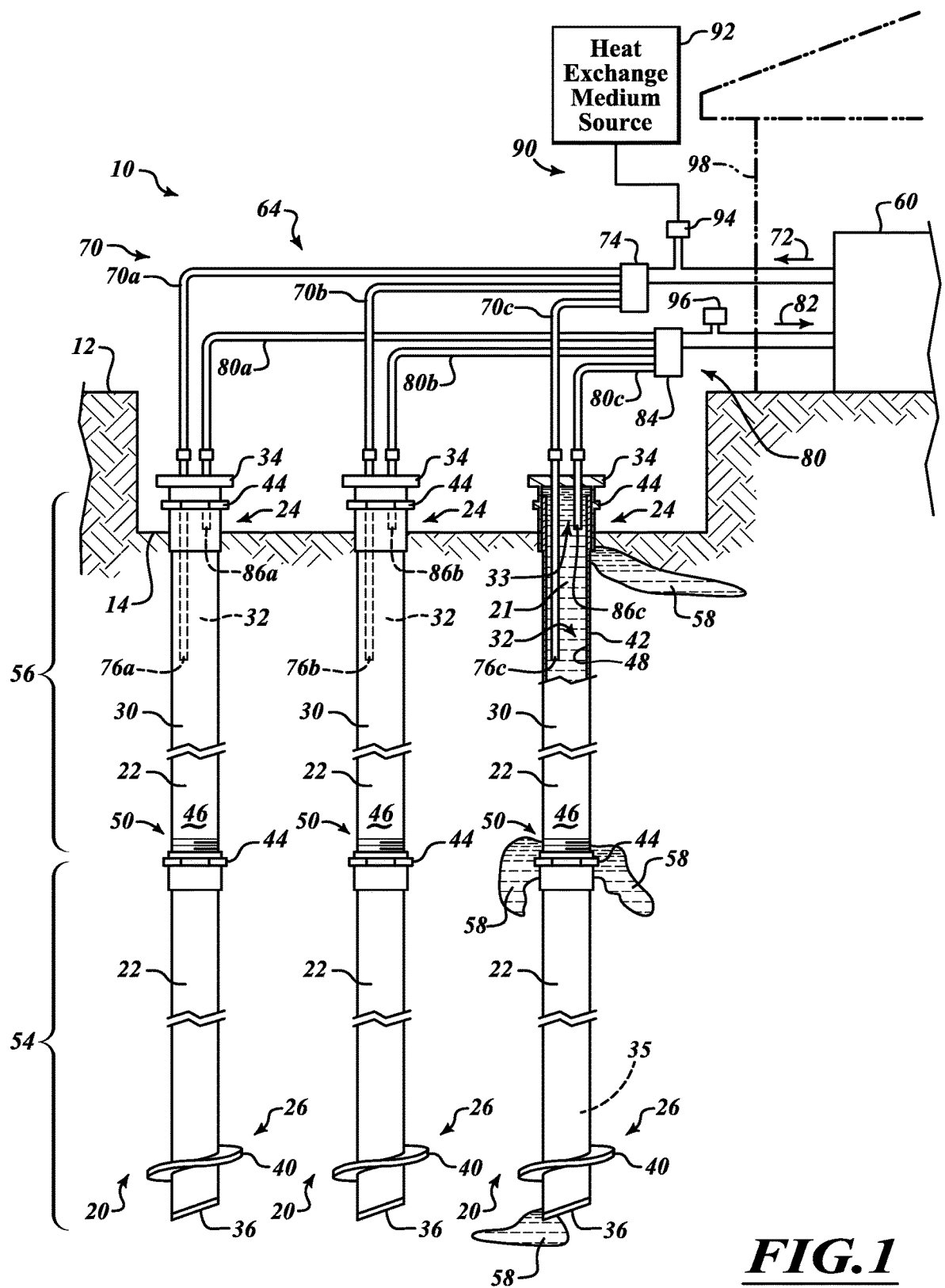
FIG. 1 is a side elevational view of a geoexchange system including a plurality of ground source heat exchangers, according to one embodiment.

FIG. 1 shows one example embodiment of a geoexchange system 10 (often referred to as a geothermal system) that is suitable to provide heating and/or cooling functionality by using the ground or earth as a heat sink during a cooling mode or as a heat source during heating mode. The geoexchange system 10 includes a plurality of ground source heat exchangers 20 that may be positioned into the ground 12 to exchange heat therewith during operation of the geoexchange system 10.

In some instances, the ground source heat exchangers 20 may be driven into the ground 12 using an installation system, which may include any of a variety of known systems for positioning an elongated object in the ground, such as, for example, the pile drivers shown and described in U.S. Pat. Nos. 6,386,295, 6,942,430 and/or 7,950,876, all of which are incorporated herein by reference. In other instances, the ground source heat exchangers 20 may be positioned in the ground 12 within pre-drilled cavities and back-filled if needed. The ground source heat exchangers 20 facilitate heat exchange between the ground 12 and a heat transfer medium 21 (preferably water or essentially water) contained and/or moving through the ground source heat exchangers 20. The heat exchange may entail delivery of thermal energy from the ground source heat exchangers 20 to the ground 12 and/or receipt of thermal energy by the ground source heat exchangers 20 from the ground 12.

The ground source heat exchangers 20 may be generally elongate structures that comprise a fluid vessel 22 having a top end 24 and a bottom end 26. The ground source heat exchangers 20 may be installed such that the top ends 24 thereof extend or protrude above the ground 12, or the ground source heat exchangers 20 may be completely buried within the ground 12. In some instances, the ground source heat exchangers 20 may be positioned with the top ends 24 protruding above a trench or depression 14 formed in the ground 12. The top ends 24 of the ground source heat exchangers 20 may be positioned at, near or below the frost line of the surrounding ground 12. The depth of placement of the ground source heat exchangers 20 may depend on climatic conditions of the area in which the system 10 is installed, characteristics of the soil of the ground 12 and/or the magnitude of heating and/or cooling functionality that is desired or required.

Each of the fluid vessels 22 of the ground source heat exchangers 20 may comprise a casing or tubular structure 30 with opposing end caps 34, 36 that collectively define an internal fluid cavity 32. More particularly, each of the fluid vessels 22 of the ground source heat exchangers 20 may include a casing or tubular structure 30, a top end cap 34 at or near the top end 24 of the heat exchanger 20 and a bottom end cap 36 at or near the bottom end 26 of the heat exchanger 20. Collectively, the casing or tubular structure 30 and opposing end caps 34, 36 may form a closed structure that defines the internal fluid cavity 32. The casing or tubular structure 30 may be generally cylindrical or may comprise other regular or irregular prismatic shapes, such as, for example, a rectangular prism. A sidewall 42 of the casing or tubing structure 30 may include an exterior surface 46 that interfaces with the ground 12 and an interior surface 48 that defines the internal fluid cavity 32 and which is in contact with the heat transfer medium 21 (e.g., water) contained and/or moving through the ground source heat exchanger 20 during operation. In this manner, the heat transfer medium 21 may be separated from the surrounding earth or ground 12 only by the thickness of the sidewall 42.

The ground source heat exchangers 20 may also include one or more features to increase drivability or to otherwise ease installation of the ground source heat exchangers 20 into the ground 12. For example, each ground source heat exchanger 20 may include an auger structure 40 at or proximate the bottom end 26 thereof. As another example, each ground source heat exchanger 20 may include an interface arrangement or structure 44 at or proximate the top end 24 thereof for interfacing with an installation system, such as, for example, a pile driver. The installation system may have a rotary interface designed to engage the interface arrangement or structure 44 at the top end 24 of the ground source heat exchangers 20 (or subsections thereof) in a manner that permits torque to be transmitted from the rotary interface to the ground source heat exchangers 20. Thus, the rotary interface of the installation system and/or the interface arrangement or structure 44 at the top end 24 of the ground source heat exchanger 20 may have features that prevent relative rotation therebetween. Such features may be arranged in a radially symmetrical pattern to allow the top end 24 to be received within the rotary interface at any of multiple relative angles. As shown in FIG. 1, the interface arrangement or structure 44 may have a generally polygonal shape such as, but not limited to, a hexagonal or octagonal shape that defines a plurality of flats. The rotary interface of the installation system may have a plurality of corresponding flats or features to receive the interface arrangement or structure 44 in a manner similar to that of a socket wrench receiving the head of a nut or bolt, for example.

The installation system may have a motor or other device that enables rotary insertion of the ground source heat exchangers 20 into the ground 12 by inducing rotation of the ground source heat exchangers 20 via the interface arrangement or structure 44. The rotation may facilitate penetration of the ground 12 with the ground source heat exchangers 20. The installation assembly may also exert downward pressure on the ground source heat exchangers 20 simultaneously with or apart from the rotation to urge the ground source heat exchangers 20 into the ground 12. The auger structure 40 may, in response to the rotation, act against the surrounding earth to draw the bottom end 26 of the ground source heat exchangers 20 deeper into the ground 12 and thereby facilitate penetration into the ground 12. The bottom end cap 36 may have a generally sharp shape as shown, which may be triangular, conical, pyramidal, or the like, to help displace earth from beneath the ground source heat exchangers 20 during penetration of the ground 12.

The top end cap 34, bottom end cap 36, the auger structure 40, and/or the interface arrangement or structure 44 may be separate pieces from the sidewall 42 of the casing or tubular structure 30, and may be secured to the sidewall 42 via welding, brazing, threading, chemical or adhesive bonding, and/or other methods. Alternatively, the sidewall 42, the top end cap 34, the bottom end cap 36, the auger structure 40 and/or the interface arrangement or structure 44 may be formed as a single piece with each other. Examples of top end caps 34, bottom end caps 36, auger structures 40, and/or interface arrangement or structures 44 that may be provided in connection with the ground source heat exchangers 20 described herein, as well as example installation systems for installing such ground source heat exchangers 20, are shown and described in U.S. Pat. Nos. 6,386,295, 6,942,430 and/or 7,950,876, which again are all incorporated herein by reference. The ground source heat exchangers 20 may likewise include any of a variety of installation features or structures and/or soil penetration features known in the field of deep foundation placement, pipe laying, pile placement, and the like.

In certain embodiments, the casing or tubular structure 30 of each of the ground source heat exchangers 20 may be a pile formed of a material having a relatively high thermal conductivity, such as, for example, steel or other metallic materials. Thermal conduction between the sidewall 42 of the casing or tubular structure 30 and the ground 12 may facilitate heat exchange between the ground 12 and each of the ground source heat exchangers 20. The sidewall 42 of the casing or tubular structure is also preferably formed of a structurally robust material such as, for example, steel or other metallic materials. This can enable the ground source heat exchangers 20 to be driven into the ground 12 with techniques that may be unsuitable for piles or other deep foundation structures made of other materials such as concrete. Steel may more effectively tolerate impact loading, static loading patterns involving tensile stress, and the like. Tensile strength, compressive strength, elasticity, thermal conductivity, thermal expansion, and corrosion resistance may all be taken into consideration when selecting a material for the casing or tubular structure 30.

In some embodiments, the fluid vessel 22, which may be collectively defined by the casing or tubular structure 30 and opposing end caps 34, 36, may be a steel pile or other deep foundation structure. Steel or other like materials may provide a relatively high degree of thermal conductivity and high structural strength to enable the ground source heat exchangers 20 to provide effective heat exchange with the ground 12, as well as provide structural support to a foundation or other structure, if desired.

The heat rejection and/or absorption capacity of the ground source heat exchangers 20 may be generally proportional to the length of the ground source heat exchangers 20. In some instances, the fluid vessel 22 may be formed of multiple parts or sections. According to certain embodiments, for example, deeper penetration of the ground 12 may be obtained by securing multiple tubular structures 30 together to form ground source heat exchangers 20. For example, the ground source heat exchangers shown in FIG. 1 each include a fluid vessel 22 having two separate casings or tubular structures 30 coupled together via a coupling 50, such as, for example, a threaded coupling. In some embodiments, two or more casings or tubular structures 30 may be coupled together to form elongated fluid vessels 22 which are well suited to penetrate the ground 12 to greater depths, while maintaining a length of each casing or tubular structure 30 that is suitable for transport, storage, material handling and installation activities.

The separate casings or tubular structures 30 may comprise casing sections that are between about four feet and about forty feet in length. The pipe sections may have an outer diameter in the range of about 4 inches to about 22 inches or greater. A thickness of the sidewall 42 of the pipe sections may be between about 0.25 inch and about 0.75 inch or greater. The casing sections may comprise DOM seamless pipe and may be formed of high-strength steel having a yield strength of between about 80 ksi and 110 ksi. In other instances, the casing sections may comprise other metallic materials, including composite materials, with suitable strength and thermal conductivity properties for use as a ground source heat exchanger 20 in the form of a deep foundation member, such as a pile.

Longer ground source heat exchangers 20 may penetrate the ground 12 to relatively greater depths and provide greater heat exchange capacity, due to increased surface area of the ground source heat exchangers 20 in contact with the ground 12. Further, the greater depths of penetration of the ground source heat exchangers 20 may enable the ground source heat exchangers 20 to reach subterranean features that can further enhance heat transfer between the ground 12 and the ground source heat exchangers 20, such as, for example, moving groundwater.

Again, the ground source heat exchangers 20 may include two or more casings or tubular structures 30 coupled together to form elongated fluid vessels 22. The separate casings or tubular structures 30 may be coupled together by a threaded coupling 50. Example embodiments of couplings that may be used are described in co-pending U.S. patent application Ser. No. 13/917,132 filed Jun. 13, 2013, which is hereby incorporated by reference. Of course, other couplings 50 known in the field of deep foundation members and pipe installation may also be used. In some instances, the coupling 50 may have a tubular shape that is sized such that a lower end of an upper one of adjacent casings or tubular structures 30 cooperates with the upper end of a lower one of adjacent casings or tubular structures 30 to define a single, generally continuous prismatic fluid cavity 32.

The ground source heat exchangers 20 may be inserted into the ground 12 in a modular fashion. More particularly, a lower section or portion 54 of each ground source heat exchanger 20 may be inserted into the ground 12 first via rotation, impact, vibration or other installation techniques. The lower section or portion 54 may be inserted to a depth that leaves the top end thereof exposed above the surface of the ground 12 or trench or depression 14. An adjacent or upper section or portion 56 of each ground source heat exchanger 20 may then be secured to the lower section or portion 54 via the coupling 50 to be driven into the ground via rotation, impact, vibration or other installation techniques until most or all of the adjacent or upper section or portion 56 is buried. The ground source heat exchangers 20 may then be provided in the example positions shown in FIG. 1.

In other embodiments, a removable coupling may be provided that can be removed from lower section or portion 54 of each ground source heat exchanger 20 after the lower section or portion 54 has been inserted into the ground 12, and prior to attachment of the adjacent or upper section or portion 56. A different coupling with a lower profile (not shown) may then be used to attach the adjacent sections 54, 56 together. Such a coupling need not receive torque or otherwise be adapted to interface with a pile installation system, for example, and thus need not have the interface arrangement or structure 44 shown in the example embodiment of FIG. 1. Accordingly, such a coupling may have a smaller diameter, and therefore present less resistance to penetration of the ground 12, thereby increasing drivability of the ground source heat exchanger 20. Such a low-profile coupling may be attached to the casing or tubular structure 30 of each section or portion 54, 56 through the use of any of a wide variety of methods including, for example, welding, threading, adhesive bonding, chemical bonding, and/or other methods.

Although the sections 54, 56 0f each ground source heat exchanger 20 may be driven into the ground 12, it is also appreciated that in other embodiments, other installation methods may be used. For example, in some instances, pre-drilled cavities may be formed in the ground to receive the respective ground source heat exchangers 20 and back filled if desired or required.

The ground source heat exchangers 20 described herein may be used in any application in which it is desirable to reject heat into the ground 12 and/or receive heat from the ground 12. Such applications include but are not limited to the heating and cooling of buildings and other structures. Furthermore, certain activities, such as, for example, certain manufacturing processes, may generate waste heat that needs to be rejected. The ground source heat exchangers 20 described herein may be used to provide a heath sink for such activities.

With continued reference to FIG. 1, the geoexchange system 10 may further include a heat pump 60 or other apparatus that is connected to the ground source heat exchangers 20. Such a heat pump may be used to heat and/or cool a building or a structure such as, for example, a home, an office, or an industrial building. The heat pump 60 may accomplish this by utilizing a refrigeration cycle to reject heat to the heat transfer medium 21 or draw heat from the heat transfer medium 21, depending on whether cooling or heating is desired.

As shown and previously described, each ground source heat exchanger 20 comprises a fluid vessel 22 having a casing or tubular structure 30 with opposing end caps 34, 36 that collectively define an internal fluid cavity 32. The cavity 32 may have a top end 33 proximate the top end 24 of the ground source heat exchanger 20 and a bottom end 35 proximate the bottom end 26 of the ground source heat exchanger 20. The heat transfer medium 21 may be located within the cavity 32, and may completely or substantially fill the cavity 32 during operation. The heat transfer medium 21 preferably consists of water or essentially water, but in some instances may include sediment, other innocuous foreign particles and/or environmentally friendly additives. The use of refrigerants containing ethylene glycol or other potentially environmentally hazardous matter should be avoided so as not to risk the leakage or seepage of such matter into the surrounding ground 12 or ground water.

Although the casing or tubular structure 30 and opposing end caps 34, 36 may collectively define a generally closed fluid vessel 22, the vessel 22 may nevertheless be prone or susceptible to leakage, as represented by the areas of leaking heat transfer medium 21 that are labeled 58. Leakage of the heat transfer medium 21 may occur, for example, at various joints that may be provided in the structure of the ground source heat exchangers 20, such as, for example, the joint between adjacent sections 54, 56 of the fluid vessel 22 or joints between the opposing end caps 34, 36 and the casing or tubular structure 30. Advantageously, the fluid vessels 22 may be constructed without regard to establishing a completely fluid-tight vessel, as the systems and methods described herein may account for leakage or other loss of the heat transfer medium 21. This can reduce the complexity and cost of fabrication as well as installation. For instance, the precision with which sections 54, 56 of the casing or tubular structure 30 may be aligned and combined during installation is diminished, thereby enabling installation in a more expedient manner.

The interior surface 48 of the casing or tubular structure 30 may define most of the boundary of the internal fluid cavity 32, and may have a corrosion resistant coating or other treatment that helps prevent corrosion of the interior surface 48. If desired, the interior surfaces of the bottom end cap 36 and/or the top end cap 34 may be similarly coated or otherwise treated.

Again, according to preferred embodiments, the heat transfer medium 21 is water or essentially water. Water is easily obtained and harmless to the ground 12 and the surrounding environment when discharged in limited quantities. Accordingly, a strict seal need not be maintained between the internal fluid cavity 32 of each ground source heat exchanger 20 and the surrounding environment. In the event some water escapes into the ground 12 from the ground source heat exchangers 20, it may be automatically replenished. The top end cap 34 may define a seal with the end of the casing or tubular structure 30. However, such a seal may be imperfect and susceptible to leakage. The top end cap 34 may advantageously be removable, re-closeable, and/or replaceable to permit relatively easy servicing of the ground source heat exchangers 20.

The heat transfer medium 21 circulated through the internal cavity 32 of each ground source heat exchanger 20 provides the medium through which heat is exchanged between the heat pump 60 and the ground source heat exchangers 20 and ultimately the ground 12. If the heat transfer medium 21 (e.g., water) circulated through the internal cavity 32 of the ground source heat exchanger 20 is at a higher temperature than the ground 12, heat may pass from the heat transfer medium 21 into the casing or tubular structure 30. If the casing or tubular structure 30, which substantially defines the internal fluid cavity 32, is formed of a material having relatively high thermal conductivity, such as, for example, steel, the heat may be distributed quickly and expediently along the longitudinal length of the casing or tubular structure 30, and may pass into the ground 12 surrounding the ground source heat exchangers 20. Conversely, if the heat transfer medium 21 circulated through the internal cavity 32 of the ground source heat exchanger 20 is at a temperature lower than that of the ground 12, the process may occur in reverse, with heat passing from the ground 12 surrounding the ground source heat exchangers 20 into the casing or tubular structure 30 and distributing quickly and expediently along the longitudinal length of the casing or tubular structure 30, and ultimately into the heat transfer medium 21.

Regardless of whether the heat transfer medium 21 is receiving heat or rejecting it, the relatively high thermal conductivity of the casing or tubular structure 30 of the ground source heat exchangers 20 enables heat to be distributed quickly and efficiently along the entire longitudinal length of the casing or tubular structure 30 irrespective of possible temperature differentials between fluid at various locations within the internal fluid cavity 32. For example, if the heat transfer medium 21 is much warmer proximate the top end 24 than proximate the bottom end 26 of the ground source heat exchanger 20, the heat from the warmer fluid proximate the top end 24 may pass into the adjacent portion of the sidewall 42, and from there, be conducted to the bottom end 26 of the ground source heat exchangers 20 more quickly and efficiently then the heat may otherwise migrate via the heat transfer fluid 21 itself. Accordingly, the full length of the sidewall 42 may be active for heat transfer with the surrounding ground 12 even if some of the heat transfer medium 21 within the internal fluid cavity does not have an ideal temperature differential relative to the ground 12 that supports efficient heat transfer. Accordingly, it may not be necessary in some instances to circulate all of the heat transfer medium 21 contained within the ground source heat exchangers 20, and in some instances, some heat transfer medium 21 in the ground source heat exchangers 20 may remain stagnant or relatively stagnant throughout operation with little if any appreciable effect on heating and cooling performance.

The geoexchange system 10 may further include a fluid distribution system 64 coupled to the ground source heat exchangers 20 to circulate the heat transfer medium 21 through the internal fluid cavities 32 during operation. For this purpose, the fluid distribution system 64 may include a supply line 70 to deliver the heat transfer medium 21 to the ground source heat exchangers 20, as represented by the arrow labeled 72. The supply line 70 may include one or more fluid supply conduits 70a, 70b, 70c, such as, for example, various pipes and hoses, and associated fittings, manifolds 74 and/or other fluid transmission components for routing the heat transfer medium 21 to the ground source heat exchangers 20 from the heat pump 60. The fluid distribution system 64 may also include a return line 80 to withdraw the heat transfer medium 21 from the ground source heat exchangers 20, as represented by the arrow labeled 82. The return line 80 may include one or more fluid return conduits 80a, 80b, 80c, such as, for example, various pipes and hoses, and associated fittings, manifolds 84 and/or other fluid transmission components for routing the heat transfer medium 21 away from the ground source heat exchangers 20 toward the heat pump 60.

The heat transfer medium 21 may be circulated into and out of the internal fluid cavity 32 of each ground source heat exchanger 20 through the use of a respective portion of the supply line 70, such as, a respective supply line conduit 70a, 70b, 70c, and respective portion of the return line 80, such as, a respective return line conduit 80a, 80b, 80c, both of which may pass through the top end cap 34. Each supply line conduit 70a, 70b, 70c may deliver the heat transfer medium 21 to the internal fluid cavities 32 of the heat exchangers 20 via a respective supply line opening 76a, 76b, 76c. Similarly, each return line conduit 80a, 80b, 80c may draw the heat transfer medium 21 from the internal fluid cavities 32 of the ground source heat exchangers 20 via a respective return line opening 86a, 86b, 86c. For each of the heat exchangers 20, the return line opening 86a, 86b, 86c may be positioned proximate the top end 33 of the internal fluid cavity 32 and the supply line opening 76a, 76b, 76c may be positioned lower than the return line opening 86a, 86b, 86c, as shown in FIG. 1, for example. Additionally, for each of the heat exchangers 20, the return line conduit 80a, 80b, 80c and corresponding return line opening 86a, 86b, 86c may be sized much smaller than a cross-section of the internal fluid cavity 32 such that the heat transfer medium 21 is withdrawn through a passage that is relatively slender (e.g., at least several magnitudes more slender) when compared to the casing or tubular structure 30. Similarly, for each of the heat exchangers 20, the supply line conduit 70a, 70b, 70c and corresponding supply line opening 76a, 76b, 76c may be sized much smaller than a cross-section of the internal fluid cavity 32 such that the heat transfer medium 21 is introduced through a passage that is relatively slender (e.g., at least several magnitudes more slender) when compared to the casing or tubular structure 30.

Coupling of the respective supply line conduits 70a, 70b, 70c and the return line conduits 80a, 80b, 80c through the top end caps 34 may facilitate or ease installation of the ground source heat exchangers 20 because the ground 12 surrounding the ground source heat exchangers 20 need not be disturbed to lay heat exchange, inlet, or outlet conduits that might otherwise be coupled to a side of the heat exchangers 20. That said, in other embodiments, some or all of the respective supply line conduits 70a, 70b, 70c and the return line conduits 80a, 80b, 80c may couple to the side of the heat exchangers 20 rather than passing through the top end caps 34.

According to some examples, the supply line opening 76a, 76b, 76c and the return line opening 86a, 86b, 86c of each ground source heat exchanger 20 may each be located within an upper portion of the internal fluid cavity 32 thereof. In this regard, the supply line opening 76a, 76b, 76c and the return line opening 86a, 86b, 86c of each ground source heat exchanger 20 may be offset from a lower end 26 of the ground source heat 20 exchanger such that a lower half of the internal fluid cavity 32 is occupied only by a standing column of the heat transfer medium. In other instances, the supply line opening 76a, 76b, 76c and the return line opening 86a, 86b, 86c of each ground source heat exchanger 20 may be located at opposing ends 24, 26 thereof.

However, because the heat exchangers 20 comprise fluid vessels 22 formed from a material having relatively high thermal conductivity, such as, for example, steel, the supply line opening 76a, 76b, 76c within each heat exchanger 20 need not be located within the bottom end 35 of the internal fluid cavity 32 in order to provide effective heat transfer functionality. Each supply line opening 76a, 76b, 76c may instead be located within an upper portion or half of the heat exchanger 20, as shown in FIG. 1. Positioning the supply line opening 76a, 76b, 76c in this manner may reduce the cost of the ground source heat exchangers 20 and/or facilitate servicing of the ground source heat exchangers 20. That said, each supply line opening 76a, 76b, 76c may positioned within the internal fluid cavity 32 anywhere along a height of the heat exchanger 20, but preferably at a different height than the corresponding return line opening 86a, 86b, 86c of each heat exchanger 20. For example, in some embodiments, each supply line opening 76a, 76b, 76c may be positioned lower than the corresponding return line opening 86a, 86b, 86c of each heat exchanger 20. In alternative embodiments (not shown), the positioning may be reversed with each supply line opening 76a, 76b, 76c being positioned higher than the corresponding return line opening 86a, 86b, 86c of each heat exchanger 20. In this case, each supply line opening 76a, 76b, 76c may be positioned at or proximate the top end 33 of the fluid cavity 32 of each respective heat exchanger 20 and each return line opening 86a, 86b, 86c may be positioned below the corresponding supply line opening 76a, 76b, 76c. In some instances, each return line opening 86a, 86b, 86c is located near or proximate the top cap 34 to reduce the pressure head upon a circulation pump or pumps that may be used to circulate the heat transfer medium 21.

According to some embodiments, the supply line 70, the return line 80 and the ground source heat exchangers 20 collectively define a ground source loop through which the heat transfer medium 21 may be circulated to provide heating and/or cooling functionality. The ground source loop may be considered a closed loop system despite the possibility of leakage and other fluid losses described herein. The fluid distribution system 64 may further comprise a fill circuit 90 coupled to the ground source loop to replenish the ground source loop with supplemental heat transfer medium 21 upon leakage or other loss of said heat transfer medium 21 from the ground source heat exchangers 20. This replenishment preferably occurs automatically without the need to access, modify and/or manually manipulate the geoexchange system 10.

As an example, the supply line 70 may be connected to a supplemental heat exchange medium source 92, such as, for example, a municipal water main or a water storage tank or reservoir. A check valve 94 may connect the supplemental heat exchange medium source 90 to the supply line 70. When the pressure differential between the supplemental heat exchange medium source 90 and the supply line 70 reaches or exceeds a given threshold, the check valve 94 may unseat or open to permit supplemental heat exchange medium (e.g., water) to fill or recharge the ground source loop. A backflow prevention device (not shown) may also be used to prevent heat exchange medium 21 from flowing back towards the supplemental heat exchange medium source 92. The supplemental heat exchange medium source 92 may be pressurized to urge the heat transfer medium 21 (e.g., water) to flow into the ground source loop when the group source loop experiences a drop in pressure sufficient to unseat or open the check valve 94. Accordingly, the upstream side of the check valve 94 may be in direct unobstructed fluid communication with supplemental heat transfer medium from the supplemental heat exchange medium source 90. Such a supplemental heat exchange medium source 92 additionally or alternatively may be connected to the return line 80 or other portion of the ground source loop. In one or more embodiments, the supplemental heat exchange medium source 92 is coupled to the ground source loop proximate the location of a circulation pump that is used to circulate the heat transfer medium 21 through the one or more ground source heat exchangers 20.

The fluid distribution system 64 may further include a purge valve 96 connected to the ground source loop, such as, for example, along a portion of the supply line 70 or the return line 80, as shown in FIG. 1. The purge valve 96 may be designed to release gas from the ground source loop that may be generated via conversion of a portion of the heat transfer medium 21 into a gaseous state. The purge valve 96 may include a check valve that releases gas based on relative pressure, or may have a vent tube or other apparatus that expels gas from the ground source loop. The purge valve 96 may be located at or proximate the highest point or elevation in the ground source loop.

The heat pump 60 (or similar apparatus) may receive the heat transfer medium 21 via the return line 80 and may receive heat from or reject heat to the heat transfer medium 21 using a heat exchanger thereof. The heat pump 60 may then direct the heat transfer medium 21 back to the internal fluid cavities 32 of the ground source heat exchangers via the supply line 70. The heat pump 60 may include one or more circulation pumps (not shown) that urge the heat transfer medium 21 to circulate through the ground source loop. In other instances, one or more circulation pumps may be provided external to the heat pump 60.

The circulation pump or pumps may alternatively be positioned within the ground source heat exchangers 20; however, it may be advantageous to position the circulation pump or pumps outside of the ground source heat exchangers 20 to keep the structures housed within the internal fluid cavities 32 thereof as simple as possible. This may facilitate installation of the ground source heat exchangers 20 and/or facilitate servicing of the geoexchange system 10 because the pump(s) need not be serviced via the comparatively restricted access available through the top ends 24 of the ground source heat exchangers 20. Indeed, in one or more embodiments, the internal fluid cavities 32 of the ground source heat exchangers 20 may be free of any obstruction between the respective supply line openings 76a, 76b, 76c and the respective return line opening 86a, 86b, 86c, thereby facilitating installation of the ground source heat exchangers 20 and/or servicing of the geoexchange system 10, and allowing relatively unimpeded flow of the heat transfer medium 21 (e.g., water) between the respective supply line openings 76a, 76b, 76c and the respective return line openings 86a, 86b, 86c.

Figure 2:
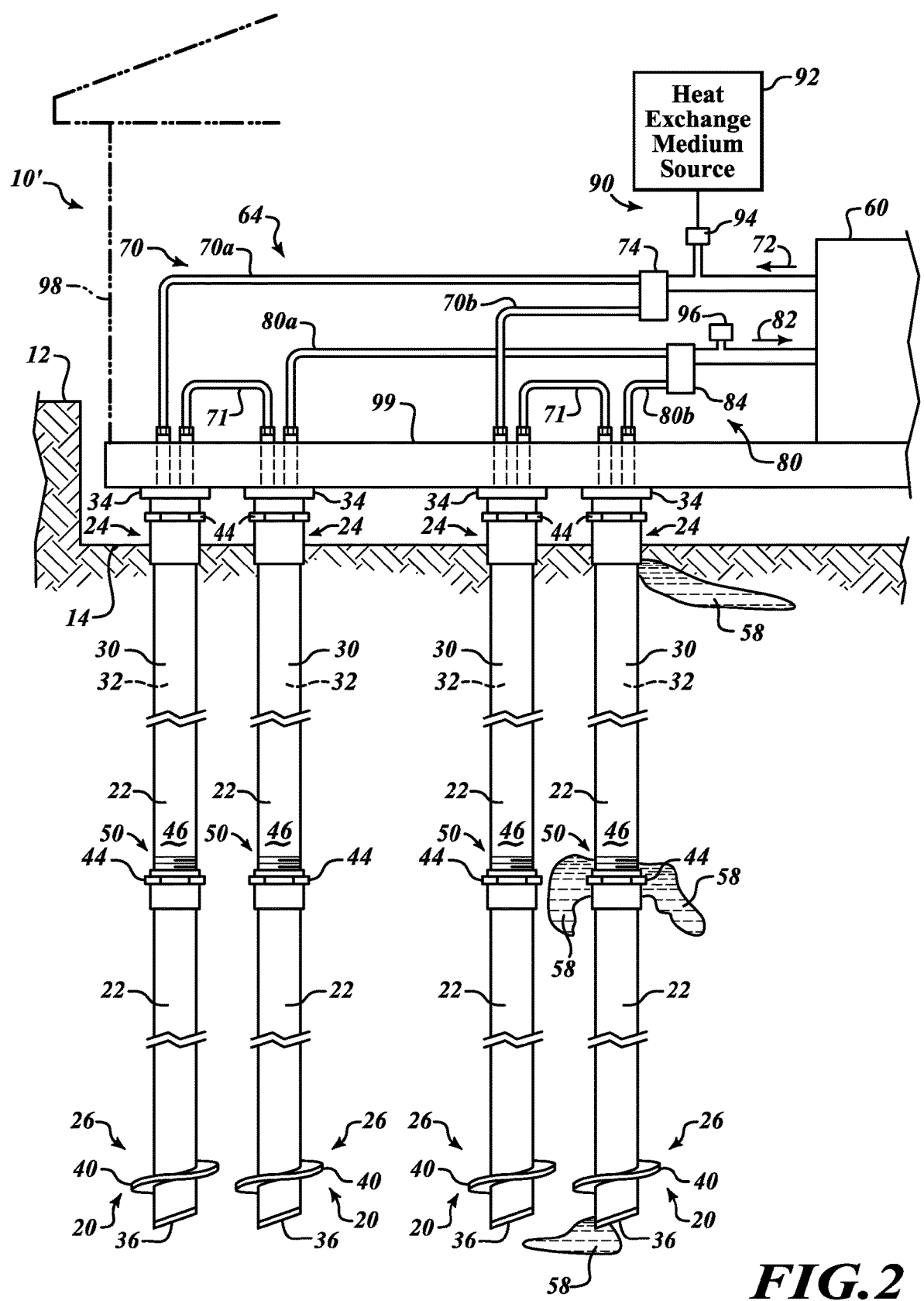
FIG. 2 is a side elevational view of a geoexchange system including a plurality of ground source heat exchangers, according to another embodiment.

The ground source heat exchangers 20 may be suitable for easy expansion of a system, allowing additional units to be installed to increase the heat transfer capacity of the system 10 into which they are installed. Such ground source heat exchangers 20 may be connected together in parallel, as shown in FIG. 1, in series, or a combination thereof, as shown in FIG. 2. Advantageously, some embodiments of the geoexchange systems may comprise groupings of ground source heat exchangers 20 connected in parallel and may be configured such that any one group may be isolated from the others and taken out of service for repairs or bypassed during periods of reduced heating or cooling demand.

FIG. 2 shows an example embodiment of a geoexchange system 10' including a plurality of ground source heat exchangers 20 connected to a heat pump 60 via a fluid distribution system 64. As shown, the ground source heat exchangers 20 may be inserted or otherwise positioned into the ground 12. They may be arranged in a line as shown, in a triangle, or in any other suitable arrangement. If the ground source heat exchangers 20 are to be used to support a foundation 99 of a building or structure 98, the specific structural support requirements may define the arrangement of the ground source heat exchangers 20. In any case, the ground source heat exchangers 20 may beneficially be spaced apart sufficiently to enable each of the ground source heat exchangers 20 to operate at peak or relatively high efficiency. Thus, a minimum spacing level may be used to determine how close each of the ground source heat exchangers 20 can be to each adjacent ground source heat exchangers 20. In other instances, some ground source heat exchangers 20 may be closely packed or arranged in relatively dense clusters.

The ground source heat exchangers 20 may all be connected to the same heat pump 60 or other heating and cooling apparatus by the fluid distribution system 64. The fluid distribution system 64 may include a supply line 70 to deliver heat transfer medium 21 to the ground source heat exchangers 20, as represented by the arrow labeled 72. The supply line 70 may include one or more fluid supply conduits 70a, 70b, such as, for example, various pipes and hoses, and associated fittings, manifolds 74 and/or other fluid transmission components for routing the heat transfer medium 21 to the ground source heat exchangers 20 from the heat pump 60. The fluid distribution system 64 may also include a return line 80 to withdraw the heat transfer medium 21 from the ground source heat exchangers 20, as represented by the arrow labeled 82. The return line 80 may include one or more fluid conduits 80a, 80b, such as, for example, various pipes and hoses, and associated fittings, manifolds 84 and/or other fluid transmission components for routing the heat transfer medium 21 away from the ground source heat exchangers 20 toward the heat pump 60. Some of the ground source heat exchangers 20 may be coupled in series by intermediate conduits 71, with these series groupings then coupled in parallel to the heat pump 60, as shown in FIG. 2. In this manner, the intermediate conduits 71 may simultaneously act as a return line for one ground source heat exchanger 20 and a supply line for another ground source heat exchanger 20. The heat transfer medium 21 may ultimately flow through all of the ground source heat exchangers 20, transferring heat with the surrounding ground 12 around each of the ground source heat exchangers 20.

Although the geoexchange system 10' of FIG. 2 is shown with four ground source heat exchangers 20, any number of ground source heat exchangers 20 may be connected in series, in parallel, or in combinations thereof, provided the circulation pump or pumps (not shown) are sufficiently sized to induce the heat transfer medium (e.g., water) to move through the entire ground source loop defined by the supply line 70, return line 80 and the ground source heat exchangers 20.

With reference to FIGS. 1 and 2, advantageously, one or more ground source heat exchangers 20 may be added to the geoexchange systems 10, 10', and appropriately plumbed to expand the capacity of such systems 10, 10'. For example, if a system 10, 10' is constructed and the heat pump 60 is operated to serve a specific heating and/or cooling purpose, the need or demand of the heat pump 60 may eventually outgrow the systems 10, 10' initial capacity. For example, changing weather conditions or usage habits, an expansion in the heated and/or cooled space, or simply initial undersizing of the system 10, 10' may lead to a need for additional heating and/or cooling capacity after the system 10, 10' has been installed. One or more additional ground source heat exchangers 20 may be conveniently added by, for example, positioning, inserting or driving one or more additional ground source heat exchangers 20 into the ground within the vicinity of the previously installed ground source heat exchangers 20. The supply line 70 and the return line 80 from the ground source heat exchangers 20 may then be connected to the one or more additional ground source heat exchangers 20 in a series and/or a parallel arrangement. The heat pump 60 may then operate with the added thermal exchange capacity provided by the one or more additional ground source heat exchangers 20.

Although connecting the ground source heat exchangers 20 in series may be relatively simple, a parallel or other arrangement may provide for greater heat transfer efficiencies, in certain situations. In addition to a parallel arrangement, multiple ground source heat exchangers 20 may be used together in a wide variety of ways. For example, a set of independent ground source heat exchangers 20 may be independently connected to a heat pump 60 or similar apparatus such that each of the ground source heat exchangers 20 provides its own thermal exchange with the heat pump 60. The heat pump 60 may have multiple internal heat exchangers (not shown) for this purpose.

With reference again to FIG. 2, the system 10' may have a supply manifold 74 connected to the heat pump 60 by section of the supply line 70. The supply line conduits 70a and 70b may pass from the supply manifold 74 to respective ground source heat exchangers 20 or groupings thereof. Thus, the heat transfer medium 21 from the heat pump 60 may pass directly to each of the parallel groups of ground source heat exchangers 20. This may help ensure that the heat transfer medium 21 received by each of the parallel groupings of ground source heat exchangers 20 is at a sufficient temperature differential relative to the surrounding ground 12 to enable efficient heat transfer through that grouping of ground source heat exchangers 20.

If desired, the system 10' may also have supply line valves (not shown) connected to each of the supply line conduits 70a, 70b leading to the ground source heat exchangers 20. The supply line valves may be used to control the flow of heat transfer medium 21 through each of the supply line conduits 70a, 70b, and therefore, the proportion of the heat transfer medium 21 flowing into each of the groupings of ground source heat exchangers 20. This may be done to properly balance the heat transfer occurring in each of the parallel groups of ground source heat exchangers 20. For example, if one group of the ground source heat exchangers 20 is discovered to provide a lower rate of heat transfer than the others, perhaps due to surrounding subterranean formations or other factors, the associated supply line valve may be adjusted to reduce the flow of heat transfer medium 21 to that group of ground source heat exchangers 20. This may enable the other ground source heat exchangers 20 to receive a greater share of the flow of heat transfer medium 21 from the heat pump 60, thereby making more effective use of heat exchangers 20 that are operating with greater heat transfer capabilities.

The supply line valves may also be used to entirely shut off flow of heat transfer medium 21 to one or more of the ground source heat exchangers 20, thereby effectively disconnecting that ground source heat exchangers 20 from the system 10'. This may be done to enable servicing of that ground source heat exchanger 20 or group of parallel ground source heat exchangers 20, or to permanently disconnect any ground source heat exchanger 20 or group that is no longer needed or has become irreparably nonfunctioning.

Similarly, the system 10' may have a return manifold 84 connected to the heat pump 60 by a section of the return line 80. The return line conduits 80a, 80b from each of the parallel groups of ground source heat exchangers 20 may convey the heat transfer medium 21 from the ground source heat exchangers 20 to the return manifold 84, where the heat transfer medium 21 from all of the ground source heat exchangers 20 may be combined together and conveyed to the heat pump 60 through the remaining portion of the return line 80.

Return line valves (not shown) may be provided on each of the return line conduits 80a, 80b. The return line valves may be used in addition to or in lieu of the supply line valves discussed above, and may also allow adjustment of the flow of heat transfer medium 21 through each of the parallel groups of ground source heat exchangers 20. The return line valves may also be used together with the supply line valves to effectively disconnect a ground source heat exchanger 20 from the system 10' as described above.

Figure 3:
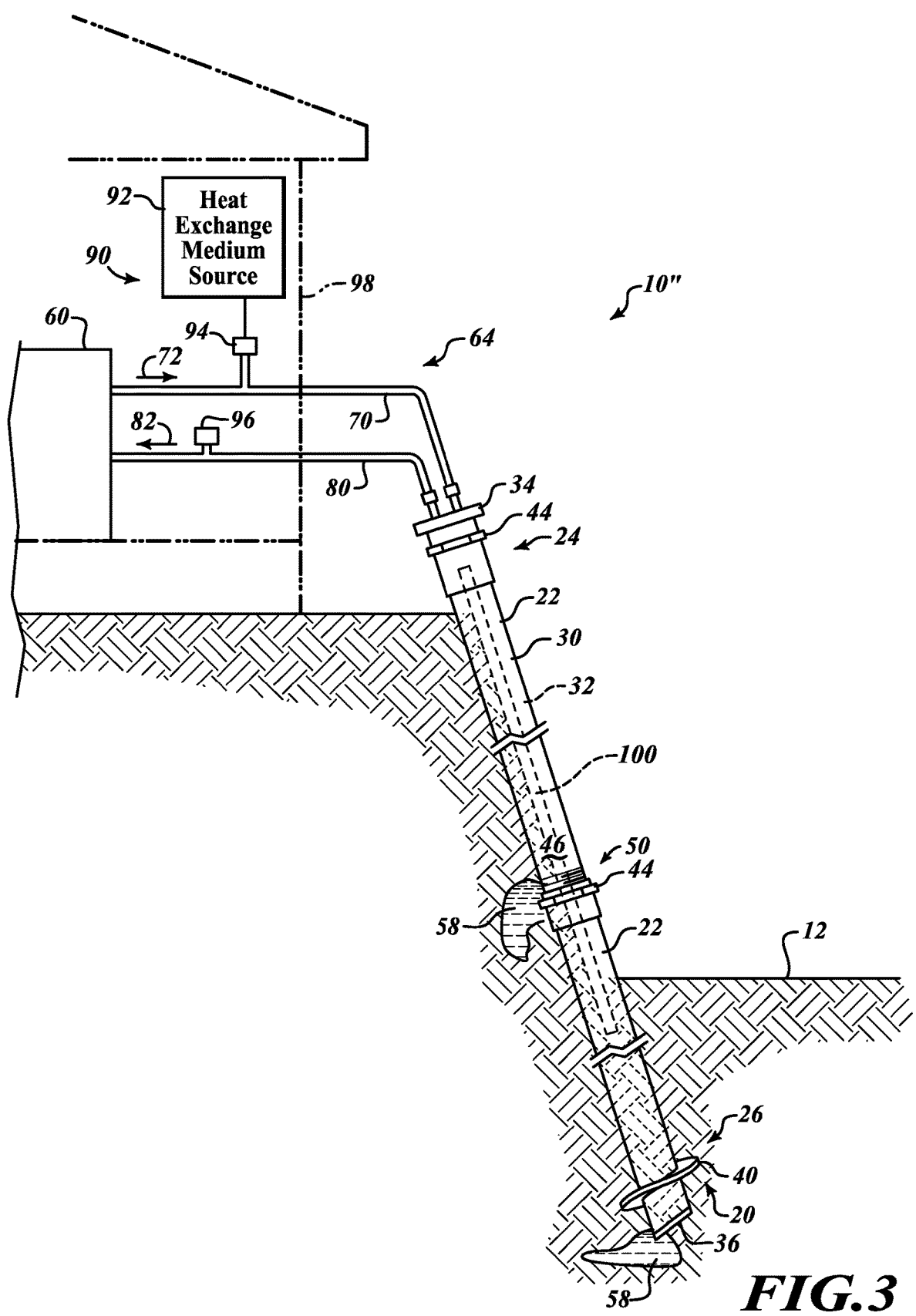
FIG. 3 is a side elevational view of a geoexchange system including a plurality of ground source heat exchangers, according to yet another embodiment.

As mentioned previously, the ground source heat exchangers 20 described herein may be used to provide structural support in addition to thermal exchange with the ground 12. Thus, the ground source heat exchangers 20 may serve as load-bearing members of various systems. According to various embodiments, such ground source heat exchangers 20 may be used to support a foundation 99 of an above-ground structure 98, as shown in FIG. 2, anchor an above-ground structure, and/or serve as a component of a soil retention assembly, as shown in FIG. 3.

Referring to FIG. 2, the example geoexchange system 10' includes four ground source heat exchangers 20 used to support a portion of a foundation 99 of an above-ground structure 98, and to provide heating and/or cooling to a space within the structure 98, such as, via a forced air system or radiant heating system coupled to the heat pump 60. The aboveground structure 98 may be any of a wide variety of buildings including but not limited to a home, an office, an industrial building, a storage facility, a commercial building, etc. The structure 98 may have a foundation 99, which may be formed of concrete, metal, or any other material. The foundation 99 illustrated in FIG. 2 is merely illustrative. A foundation 99 supported by ground source heat exchangers 20 according to embodiments of the present invention may take on a variety of forms and configurations.

The foundation 99 may be aboveground, or may, in other embodiments, be belowground. Accordingly, the top end 24 of each of the ground source heat exchangers 20 may be exposed above the surface of the ground 12 or within a trench or depression 14, or may be buried so that entirety of each of the ground source heat exchangers 20 is entirely below the surface of the ground 12. In deep foundation applications or the like, each of the ground source heat exchangers 20 may be buried many feet below the surface of the ground 12.

In other alternative embodiments, the top ends 24 of the ground source heat exchangers 20 may be more exposed than as shown in FIG. 2. For example, if the structure 98 is to be suspended higher above the surface of the ground 12, it may be desirable to have the ground source heat exchangers 20 extend to a greater height above the ground 12. Such an arrangement may decrease the ability of the ground source heat exchangers 20 to transfer heat to or from the ground 12 due to the lower surface area of the ground 12 in contact with the ground source heat exchangers 20, but may still be desirable to meet a structural need.

The structure 98 may be heated and/or cooled through the use of a heat pump 60 or similar apparatus that is connected to the ground source heat exchangers 20 through the use of the supply line 70 and the return line 80. Again, the ground source heat exchangers 20 may be connected to the heat pump 60 in series, in parallel as shown in FIG. 1, or in a combination of series and parallel connections as shown in FIG. 2. Thus, the heat pump 60 may receive heat from or reject heat to the ground 12 via the ground source heat exchangers 20, which also serve as structural load-bearing supports on which the foundation 99 of the structure 98 is placed.

The heat pump 60 or similar apparatus may provide heating and/or cooling to the structure 98 through the use of a variety of systems. A fluid such as air, water, a refrigerant, or the like may be circulated through at least a portion of the structure 98 to heat or cool the interior of the structure 98. As an example, the geoexchange systems 10, 10' described above and associated ground source heat exchangers 20 may be used with other known types of heating or cooling systems including forced air, hydronic and radiant heating and cooling systems.

In some embodiments, one or more ground source heat exchangers 20 may serve as anchors for a structure, such as, for example, a bridge or overpass. The structure may span a chasm or other natural feature. The structure may have a horizontal expanse that spans the chasm. The horizontal expanse may have a road, railroad track, foot path, or the like. The structure may also have other components that provide support to the horizontal expanse. Such components may include vertical supports, which may be positioned on either end of the horizontal expanse, and a support assembly that supports the length of the horizontal expanse via the vertical supports. The structure may be a suspension type bridge, or any of a wide variety of structures that can benefit from anchorage in the ground 12.

The structure may rest directly on the ground source heat exchangers 20 in a manner similar to that of the structure 98 shown in FIG. 2. Alternatively, the structure may not rest on the ground source heat exchangers 20, but may instead be supported by the ground source heat exchangers 20 via anchor lines that extend from the top ends 24 of the ground source heat exchangers 20 to the tops of the vertical supports or other support members or features. The anchor lines may thereby serve as connectors that hold the vertical supports in a desired orientation, balancing the inward bending moment that may be exerted on the vertical supports.

In addition to providing structural support, the ground source heat exchangers 20 may facilitate dissipation of thermal energy from the structure to the ground 12, or may be connected to a heat pump 60 or similar apparatus that may serve a useful function, such as, heating and/or cooling structures on or adjoining the supported structure. Advantageously, bridges, roads, sidewalks and other structures in the vicinity of the supported structure may be heated for de-icing or other purposes.

In addition to bridges and overpasses, the systems and methods described herein may be used to provide structural support and/or thermal transfer for a wide variety of structures. Such structures include but are not limited to residential buildings, office buildings, industrial buildings, commercial buildings, antennas, smokestacks, utility poles, towers, and the like.

Referring now to FIG. 3, a geoexchange system 10" is shown including a ground source heat exchanger 20 that serves as a soil retention element. As shown in FIG. 3, the ground source heat exchanger 20 may be inserted into the ground 12 proximate a volume of soil that needs to be retained. Additional ground source heat exchangers 20 may be provided in a spaced apart manner, and may serve as end points and/or anchors of barriers in the form of a wall 100 or other retention device that span the distance between such ground source heat exchangers 20. The wall 100 may have a soil-facing surface that abuts the soil to help keep the soil in a desired location. If desired, the geoexchange system 10 may define a segment of a retaining wall or other larger soil retention system with many ground source heat exchangers 20. Such ground source heat exchangers 20 may or may not be arranged in a straight line and may or may not be oriented in a vertical orientation. The ground source heat exchangers 20 may provide structural support that keeps the retaining wall in place, thereby keeping the soil in place. Additionally, the ground source heat exchangers 20 may provide thermal exchange that can be used for heating and/or cooling purposes in a manner similar to the other geoexchange systems 10, 10' described herein.

Although the figures illustrate the use of ground source heat exchangers 20 having a generally common structure or form, those of ordinary skill in the relevant art will immediately recognize that ground source heat exchangers 20 may be provided in a variety of forms and configurations and that ground source heat exchangers 20 of different forms and configurations may be combined and used together in the same geoexchange system. Further, the geoexchange systems 10, 10', 10" described and shown herein are representative, and those of ordinary skill in the relevant art will recognize that the ground source heat exchangers 20 and geoexchange systems 10, 10', 10" may be used to provide structural support in a wide variety of situations not specifically set forth herein.

In accordance with the various geoexchange systems 10, 10', 10" and ground source heat exchangers 20 described herein, a related method of installing a geoexchange system 10, 10', 10" may be provided which includes installing at least one ground source heat exchanger 20 into the ground 12 that includes a metallic vessel 22 having an exterior surface 46 that interfaces with the ground 12 and an interior surface 48 that defines an internal fluid cavity 32. In some instances, installing the at least one ground source heat exchanger 20 into the ground 12 may include driving one or more ground source heat exchanger 20 into the ground with, for example, a pile driver or other deep foundation member installation device or technique. For example, in some embodiments, one or more ground source heat exchangers 20 may be positioned within the ground in respective pre-drilled cavities.

The method may further include coupling the at least one ground source heat exchanger 20 to a heat pump 60 via a fluid distribution system 64. The fluid distribution system 64 may include a supply line 70, a return line 80 and a circulation pump to circulate water through the internal fluid cavity 32 of the ground source heat exchanger 20 during operation to absorb heat from the ground during a heating mode and/or to reject heat into the ground during a cooling mode. The method may further include coupling the fluid distribution system 64 to a water source 92 to enable automatic replenishment of the ground source heat exchanger 20 with supplemental water upon water loss. Water loss may include leakage from the one or more ground source heat exchangers 20 or conversion of water circulating through the one or more ground source heat exchangers to gas. Water may be automatically replenished, for example, by a fill circuit 90 that is coupled to the supply line 70 or the return line 80 and configured to discharge fluid into the same upon a pressure drop in the ground source loop that is sufficient to open or unseat a check valve 94 provided in the fill circuit 90. Water may be automatically replenished until the ground source loop is charged to a desired operating pressure. The desired operating pressure may be a relatively low pressure in the range of about 5 psi to about 35 psi, or about 15 psi to about 25 psi.

The method of installation may further include acquiring performance data from one or more ground source heat exchangers 20 and installing one or more supplemental ground source heat exchangers 20 into the ground and coupling the one or more supplemental ground source heat exchangers 20 to the heat pump 60 based at least in part on said performance data and an expected demand of the heat pump 60. In other words, performance data may be acquired to assess the actual performance of an existing geoexchange system installation relative to the expected demand of the heat pump 60 and determine whether one or more additional ground source heat exchangers 20 may be needed to meet said demand. The method may further include selecting a size and/or length of said one or more supplemental heat exchangers 20 based on an observed or calculated deficiency of the existing geoexchange system.

In accordance with the various geoexchange systems 10, 10', 10" and ground source heat exchangers 20 described herein, a related method of operating a geoexchange system 10, 10', 10" may be provided which includes circulating water 21 through a ground source loop to absorb heat from the ground 12 during a heating mode and/or to reject heat into the ground 12 during a cooling mode, the ground source loop including at least one ground source heat exchanger 20 comprising a metallic fluid vessel 22 having an exterior surface 46 that interfaces with the ground 12 and an interior surface 48 that is in contact with said water 21 during operation. The method further includes automatically introducing supplemental water into the ground source loop upon water leakage from the at least one ground source heat exchanger 20 or conversion of water from the ground source loop to gas. In this manner, the ground source loop can be maintained at operational capacity despite such water loss from the at least one ground source heat exchanger.

The geoexchange system 10, 10', 10" may be operated in a periodic or cyclical manner and the cycles may fluctuate in duration in response to changing demands and variations in the climate and other factors. During operation, the ground source heat exchanger 20 and surrounding ground 12 may become stressed due to the transfer of heat therebetween. For example, during a cooling mode, the temperature of the ground source heat exchanger 20 and the surrounding ground 12 may rise above desired levels due to the rejection of heat into the ground 12. Conversely, during a heating mode, the temperature of the ground source heat exchanger 20 and the surrounding ground 12 may fall below desired levels due to the withdrawal of heat from the ground 12.

Accordingly, in some instances, the method of operating the geoexchange system 10, 10', 10" may include destressing the ground source heat exchanger 20 and the ground 12 surrounding the ground source heat exchanger 20. Destressing may include causing the temperature of the ground source heat exchanger 20 and the ground 12 surrounding the ground source heat exchanger 20 to move towards or approach an average temperature of the earth or ground in the vicinity of the geoexchange system 10, 10', 10". Destressing the ground source heat exchanger 20 and the ground 12 surrounding the at least one ground source heat exchanger 20 may include, for example, circulating water 21 through the ground source heat exchanger 20 with a circulation pump. The water 21 may be circulated through the ground source heat exchanger 20 at a volumetric flow rate that is less than an average volumetric flow rate at which the water 21 is circulated when the heat pump 60 is active. In other instances, the volumetric flow rate may be about the same as the average volumetric flow rate at which the water 21 is circulated when the heat pump 60 is active.

In other instances, destressing the ground source heat exchanger 20 and the ground 12 surrounding the ground source heat exchanger 20 may include discharging water 21 from the ground source loop and introducing supplemental water into the ground source loop having a different average temperature than the discharged water 21. For example, when the ground source loop is stressed as a result of cooling operations, water 21 may be discharged from the ground source loop and supplemental water having a lower temperature than the discharged water 21 may be introduced and circulated to destress the ground source heat exchanger 20 and the surrounding ground 12. The discharged water may be used for any desired purpose, for example, as irrigation water. Conversely, when the ground source loop is stressed as a result of heating operations, water 21 may be discharged from the ground source loop and supplemental water having a higher temperature than the discharged water 21 may be introduced and circulated to destress the ground source heat exchanger 20 and the surrounding ground 12.

Other aspects of installing and/or operating the geoexchange systems 10, 10', 10" and subsystems thereof will be apparent or appreciated upon a review of the features, structures and functionalities disclosed herein.

Moreover, various aspects of the embodiments described above can be combined to provide further embodiments. In addition, all of the U.S. patents, U.S. patent application publications, U.S. patent applications, foreign patents, foreign patent applications and non-patent publications referred to in this specification and/or listed in the Application Data Sheet, are incorporated herein by reference in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A geoexchange system comprising:
   ground;
   heat transfer medium;
   a ground source heat exchanger positioned in the ground, the ground source heat exchanger including a vessel consisting of metal and having an exterior surface that is interfaced in direct contact with the ground, including ground water therein, and an interior surface that defines an internal fluid cavity, wherein the vessel comprises a tubular casing including one or more tubular casing sections that isolate the ground water from entering the internal fluid cavity of the vessel through a respective side wall of each of the one or more tubular casing sections, wherein the heat transfer medium is circulated through the ground source heat exchanger during operation, and wherein the heat transfer medium is in contact with the interior surface of the vessel and substantially fills the internal fluid cavity of the vessel such that an upper surface of the heat transfer medium in the vessel that defines a fill level of the vessel is adjacent an upper end of the vessel; and
   a distribution system coupled to the ground source heat exchanger to circulate the heat transfer medium through the internal fluid cavity of the ground source heat exchanger during operation, the distribution system including
      a supply line to deliver the heat transfer medium to the ground source heat exchanger, the supply line having a supply conduit portion that extends into the internal fluid cavity of the vessel and defines an internal supply passage through which, during operation, the heat transfer medium moves before discharging through a supply line outlet at an extreme end of the supply conduit portion of the supply line, which is below the fill level of the vessel, directly into a complete cross-sectional volume of the internal fluid cavity of the vessel that consists of a column of the heat transfer medium,
      a return line to withdraw the heat transfer medium from the ground source heat exchanger, the return line having a return conduit portion that extends into the internal fluid cavity of the vessel and defines an internal return passage through which, during operation, the heat transfer medium moves after entering through a return line inlet at an extreme end of the return conduit portion of the return line, which is below the fill level of the vessel, and
      a fill circuit to automatically replenish the ground source heat exchanger with supplemental heat transfer medium.

2. The geoexchange system of claim 1 wherein the geoexchange system is operable with a heat pump to provide heating and cooling functionality and is configured to absorb heat from the ground during a heating mode and to reject heat into the ground during a cooling mode.

3. The geoexchange system of claim 1 wherein the heat transfer medium consists of water or essentially of water.

4. The geoexchange system of claim 1 wherein the supply line, the return line and the ground source heat exchanger collectively define a ground source loop, and wherein the fill circuit includes a check valve to introduce supplemental water into the ground source loop from a supplemental water source in response to an existence of a pressure differential across the check valve that exceeds a threshold.

5. The geoexchange system of claim 4 wherein the heat transfer medium is water and the ground source loop is susceptible to water loss such that the operating pressure of the ground source loop periodically declines below the threshold upon water leakage from the ground source heat exchanger or conversion of water in the ground source loop to gas that escapes the ground source loop.

6. The geoexchange system of claim 4 wherein the upstream side of the check valve is in direct unobstructed fluid communication with supplemental water from the supplemental water source.

7. The geoexchange system of claim 1 wherein the heat transfer medium is water and the fill circuit is configured to automatically replenish the ground source heat exchanger with supplemental water upon water leakage from the ground source heat exchanger or conversion of water from the ground source heat exchanger to gas.

8. The geoexchange system of claim 1 wherein the distribution system further includes a purge valve to release gas from the distribution system.

9. The geoexchange system of claim 1 wherein the vessel of the heat exchanger is a deep foundation member.

10. The geoexchange system of claim 9 wherein the deep foundation member is a pile that includes at least one of an auger structure at a lower end thereof and an engagement structure at an upper end thereof for coupling to a rotary pile driver system.

11. The geoexchange system of claim 1 wherein the vessel of the ground source heat exchanger includes end caps coupled to the one or more tubular casing sections to define a substantially closed fluid vessel.

12. The geoexchange system of claim 1 wherein the vessel of the ground source heat exchanger is a load-bearing member selected from the group consisting of:
    an anchor for an above-ground structure;
    a foundation support for a structure; and
    a soil retention element.

13. The geoexchange system of claim 1 wherein the supply line outlet at the extreme end of the supply conduit portion of the supply line and the return line inlet at the extreme end of the return conduit portion of the return line are each located at a different height along a longitudinal length of the ground source heat exchanger.

14. The geoexchange system of claim 13 wherein the internal fluid cavity of the vessel of the ground source heat exchanger has an upper half and a lower half, and wherein the supply line outlet at the extreme end of the supply conduit portion of the supply line and the return line inlet at the extreme end of the return conduit portion of the return line are each located within the upper half of the internal fluid cavity of the vessel of the ground source heat exchanger.

15. The geoexchange system of claim 13 wherein the internal fluid cavity of the vessel of the ground source heat exchanger has an upper half and a lower half, the heat transfer medium is water, and the supply line outlet at the extreme end of the supply conduit portion of the supply line and the return line inlet at the extreme end of the return conduit portion of the return line are offset from a lower end of the vessel of the ground source heat exchanger such that the lower half of the internal fluid cavity of the vessel is occupied only by a standing column of water.

16. The geoexchange system of claim 1 wherein the supply conduit portion that extends into the internal fluid cavity of the vessel and defines the internal supply passage through which, during operation, the heat transfer medium moves before discharging through the supply line outlet consists of a non-insulated conduit section, and wherein the internal fluid cavity of the vessel in a vicinity of a terminal end of the non-insulated conduit section containing the supply line outlet consists of an annular column of the heat transfer medium between the vessel and the terminal end of the non-insulated conduit section such that movement of the heat transfer medium past an exterior surface of the terminal end of the non-insulated conduit section is unimpeded.

17. A geoexchange system comprising:
ground;
heat transfer medium in the form of water;
a ground source heat exchanger positioned in the ground, the ground source heat exchanger comprising a vessel consisting of metal and having an exterior surface that is interfaced in direct contact with the ground, including ground water therein, and an interior surface that defines an internal fluid cavity, wherein the vessel comprises a tubular casing including one or more tubular casing sections that isolate the ground water from entering the internal fluid cavity of the vessel through a respective side wall of each of the one or more tubular casing sections, wherein the water is circulated through the ground source heat exchanger during operation, and wherein the water is in contact with the interior surface of the vessel and substantially fills the internal fluid cavity of the vessel such that an upper surface of the water in the vessel that defines a fill level of the vessel is adjacent an upper end of the vessel; and
a distribution system coupled to the ground source heat exchanger to circulate the water through the ground source heat exchanger, the distribution system including
a supply line having a supply conduit portion that extends into the internal fluid cavity of the vessel and defines an internal supply passage through which, during operation, the water moves before discharging through a supply line outlet at an extreme end of the supply conduit portion of the supply line, which is below the fill level of the vessel, directly into a complete cross-sectional volume of the internal fluid cavity of the vessel that consists of a column of the water,
a return line having a return conduit portion that extends into the internal fluid cavity of the vessel and defines an internal return passage through which, during operation, the water moves after entering through a return line inlet at an extreme end of the return conduit portion of the return line, which is below the fill level of the vessel,
a circulation pump to circulate the water through the internal fluid cavity of the ground source heat exchanger via the supply and return lines,
a purge valve to release gas from the distribution system, and
a fill circuit configured to automatically replenish the internal fluid cavity of the ground source heat exchanger with supplemental water.

18. The geoexchange system of claim 17 wherein the geoexchange system is operable with a heat pump to provide heating and cooling functionality and is configured to absorb heat from the ground during a heating mode and to reject heat into the ground during a cooling mode.

19. The geoexchange system of claim 17 wherein the vessel of the ground source heat exchanger is at least one of a deep foundation member and a load-bearing member.

20. The geoexchange system of claim 17 wherein the internal fluid cavity of the vessel of the ground source heat exchanger has an upper half and a lower half, and wherein the supply line outlet at the extreme end of the supply conduit portion of the supply line is located within the upper half of the internal fluid cavity of the vessel of the ground source heat exchanger to discharge water into the internal fluid cavity and the return line inlet at the extreme end of the return conduit portion of the return line is located within the upper half of the internal fluid cavity of the vessel of the ground source heat exchanger to withdraw water from the internal fluid cavity, and
wherein at least the lower half of the internal fluid cavity of the vessel is occupied only by a standing column of water during operation.

21. The geoexchange system of claim 20 wherein the supply line outlet at the extreme end of the supply conduit portion of the supply line and the return line inlet at the extreme end of the return conduit portion of the return line are positioned such that water at the lower half of the internal fluid cavity of the vessel ranges from stagnant to a lesser flow velocity compared to water at the upper half of the internal fluid cavity which moves from the supply line outlet at the extreme end of the supply conduit portion of the supply line toward the return line inlet at the extreme end of the return conduit portion of the return line during operation.

22. The geoexchange system of claim 17 wherein the extreme end of the supply conduit portion of the supply line within the internal fluid cavity of the ground source heat exchanger is at least several magnitudes more slender than the vessel.

23. The geoexchange system of claim 17 wherein the internal fluid cavity of the vessel of the ground source heat exchanger has an upper half and a lower half, and wherein the lower half of the internal fluid cavity of the vessel is occupied only by water and the extreme end of the supply conduit portion of the supply line such that movement of water from the supply line outlet at the extreme end of the supply conduit portion of the supply line toward the return line inlet at the extreme end of the return conduit portion of the return line during operation is unimpeded by any internal structure of the ground source heat exchanger.

24. The geoexchange system of claim 17 wherein the supply conduit portion that extends into the internal fluid cavity of the vessel and defines the internal supply passage through which, during operation, the water moves before discharging through the supply line outlet consists of a non-insulated conduit section, and wherein the internal fluid cavity of the vessel in a vicinity of a terminal end of the non-insulated conduit section containing the supply line outlet consists of an annular column of the water between the vessel and the terminal end of the non-insulated conduit section such that movement of the water past an exterior surface of the terminal end of the non-insulated conduit section is unimpeded.

25. A geoexchange system comprising:
ground;
heat transfer medium;
a ground source heat exchanger positioned in the ground, the ground source heat exchanger including a vessel consisting of metal and having an external surface that is interfaced in direct contact with the ground, including ground water therein, and an internal surface that defines an internal fluid cavity, wherein the vessel comprises a tubular casing including one or more tubular casing sections that isolate the ground water from entering the internal fluid cavity of the vessel through a respective side wall of each of the one or more tubular casing sections, wherein the internal fluid cavity has an upper half and a lower half, wherein the heat transfer medium is circulated through the ground source heat exchanger during operation, and wherein the heat transfer medium is in contact with the interior surface of the vessel and substantially fills the internal fluid cavity of the vessel such that an upper surface of the heat transfer medium in the vessel that defines a fill level of the vessel is adjacent an upper end of the vessel; and a distribution system coupled to the ground source heat exchanger to circulate a heat transfer medium through the upper half of the internal fluid cavity of the ground source heat exchanger during operation, the distribution system including a supply line to deliver the heat transfer medium to the ground source heat exchanger, the supply line including a supply conduit portion that extends into the internal fluid cavity of the vessel and defines an internal supply passage through which, during operation, the heat transfer medium moves before discharging through a supply line outlet at an extreme end of the supply conduit portion of the supply line, which is below the fill level of the vessel, and a return line to withdraw the heat transfer medium from the ground source heat exchanger, the return line including a return conduit portion that extends into the internal fluid cavity of the rigid metal vessel and defines an internal return passage through which, during operation, the heat transfer medium moves after entering through a return line inlet at an extreme end of the return conduit portion, which is below the fill level of the vessel, wherein the supply line outlet of the supply conduit portion of the supply line and the return line inlet of the return conduit portion of the return line are located within the upper half of the internal fluid cavity of the vessel of the ground source heat exchanger, and wherein at least the lower half of the internal fluid cavity of the vessel is occupied only by a standing column of the heat transfer medium during operation.

26. The geoexchange system of claim 25 wherein the outlet of the supply line and the inlet of the return line are positioned such that heat transfer medium at the lower half of the internal fluid cavity of the vessel ranges from stagnant to a lesser flow velocity when compared to heat transfer medium at the upper half of the internal fluid cavity which moves from the outlet of the supply line toward the inlet of the return line during operation.

27. The geoexchange system of claim 25 wherein the supply conduit portion that extends into the internal fluid cavity of the vessel and defines the internal supply passage through which, during operation, the heat transfer medium moves before discharging through the supply line outlet consists of a non-insulated conduit section, and wherein the internal fluid cavity of the vessel in a vicinity of a terminal end of the non-insulated conduit section containing the supply line outlet consists of an annular column of the heat transfer medium between the vessel and the terminal end of the non-insulated conduit section such that movement of the heat transfer medium past an exterior surface of the terminal end of the non-insulated conduit section is unimpeded.

28. A geoexchange system comprising:
ground;
heat transfer medium in the form of water;
a ground source heat exchanger positioned in the ground, the ground source heat exchanger comprising a vessel consisting of metal and having an external surface that is interfaced in direct contact with the ground, including ground water therein, and an internal surface that defines an internal fluid cavity, wherein the vessel comprises a tubular casing including one or more tubular casing sections that isolate the ground water from entering the internal fluid cavity of the vessel through a respective side wall of each of the one or more tubular casing sections, wherein the internal fluid cavity has an upper half and a lower half, and wherein the water is circulated through the ground source heat exchanger during operation, and wherein the water is in contact with the interior surface of the vessel and substantially fills the internal fluid cavity of the vessel such that an upper surface of the water in the vessel that defines a fill level of the vessel is adjacent an upper end of the vessel; and a distribution system coupled to the ground source heat exchanger to circulate the water through at least a portion of the ground source heat exchanger, the distribution system including a supply line having a supply conduit portion that extends into the internal fluid cavity of the vessel and defines an internal supply passage through which, during operation, the water moves before discharging through a supply line outlet at an extreme end of the supply conduit portion of the supply line that is located at the upper half of the internal fluid cavity of the vessel of the ground source heat exchanger and below the fill level of the vessel, a return line having a return conduit portion that extends into the internal fluid cavity of the vessel and defines an internal return passage through which, during operation, the water moves after entering through a return line inlet at an extreme end of the return conduit portion that is located at the upper half of the internal fluid cavity of the vessel of the ground source heat exchanger and below the fill level of the vessel, a circulation pump to circulate the water through the upper portion of the internal fluid cavity of the vessel of the ground source heat exchanger via the supply and return lines, a purge valve to release gas from the distribution system, and a fill circuit configured to automatically replenish the internal fluid cavity of the vessel of the ground source heat exchanger with supplemental water.

29. The geoexchange system of claim 28 wherein the supply line outlet at the extreme end of the supply conduit portion of the supply line and the return line inlet at the extreme end of the return conduit portion of the return line are positioned such that water at the lower half of the internal fluid cavity of the vessel ranges from stagnant to a lesser flow velocity when compared to water at the upper half of the of the internal fluid cavity which moves from the supply line outlet at the extreme end of the supply conduit portion of the supply line toward the return line inlet at the extreme end of the return conduit portion of the return line during operation.

30. The geoexchange system of claim 28 wherein the supply conduit portion that extends into the internal fluid cavity of the vessel and defines the internal supply passage through which, during operation, the water moves before discharging through the supply line outlet consists of a non-insulated conduit section, and wherein the internal fluid cavity of the vessel in a vicinity of a terminal end of the non-insulated conduit section containing the supply line outlet consists of an annular column of the water between the vessel and the terminal end of the non-insulated conduit section such that movement of the water past an exterior surface of the terminal end of the non-insulated conduit section is unimpeded.

* * * * *